Patented July 21, 1953

2,646,449

UNITED STATES PATENT OFFICE 2,646,449

FLUOROCARBON COMPOUNDS AND PREPARATION OF SAME

James Elliot Carnahan, Wilmington Manor, New Castle, Del., and Herman Julian Sampson, Waynesboro, Va., assignors to E. I. du Pont de Nemours & Company, Wilmington, Del., a corporation of Delaware No Drawing. Application June 29, 1950, Serial No. 171,244

3 Claims. (Cl. 260—583)

This invention relates to new organic compounds containing nitrogen and fluorine and, more particularly, to a new class of fluorinated amines and a method of preparing them.

In spite of the great technical interest in fluorinated organic compounds and of the considerable advances made in their chemistry in the last few years, the chemical literature contains almost no description of fluorinated aliphatic amines. In particular, long chain (five or more carbon atoms) aliphatic primary amines having several carbon atoms completely substituted by fluorine atoms are unknown, and there are no known general or even specific methods of preparing these amines.

An object of the present invention is to provide a new class of fluorinated amines and a method of preparing same. A more particular object is to provide a class of fluorinated amines which are highly effective as surface-active or dispersing agents. Other objects will be apparent from the description of the invention given hereinafter.

The above objects are accomplished according to the present invention by providing, as a new class of fluorocarbon compounds, the primary amines having the formula $H(CF_2)_nCH_2NH_2$ wherein $n$ is an even integer at least equal to 4, and the water-soluble acid salts thereof. The preferred compounds are the amines having the above formula wherein $n$ is an even integer from 4 to 20, inclusive, and the water-soluble acid salts thereof. A still more preferred subgroup because of the exceptional properties of the members as dispersing agents, are the amines wherein $n$ is an even integer from 6 to 12, inclusive, and, particularly, the water-soluble acid salts of these amines.

The invention further comprises the process of preparing the above defined amines by reacting the corresponding polyfluoroalkanoic acid amide, $H(CF_2)_nCONH_2$, with a reducing agent in a liquid inert anhydrous solvent to reduce the amido carbonyl group of the acid amide to a methylene group.

The polyfluoroalkanoic acid amide from which the amines of this invention are prepared, are themselves conveniently prepared from the polyfluoroalkanoic acid of the formula $H(CF_2)_nCOOH$. Acids of this type may be prepared according to the general method described in copending application Serial No. 65,065, now Patent No. 2,559,629, filed by K. L. Berry on December 13, 1948. This method consists in oxidizing, with a permanganate as the oxidizing agent, a polyfluoroalkanol of the formula $H(CF_2)_nCH_2OH$, wherein $n$ has the same significance as above. These polyfluoroalkanols are themselves obtained, according to copending application Serial No. 65,063, now Patent No. 2,559,628, filed by R. M. Joyce on December 13, 1948, by heating a mixture of methanol and tetrafluoroethylene at a temperature between 75° C. and 350° C., in the presence of a free radical-producing catalyst.

To prepare the polyfluoroalkyl amines, the polyfluoroalkanoic acids are first converted to the acid halides, preferably acid chlorides, and the acid halides are reacted with ammonia to form the corresponding polyfluoroalkanoic acid amides. The amides are then treated in an anhydrous medium with a reducing agent capable of hydrogenating the amido carbonyl group to a methylene group, thus producing the polyfluoroalkyl amines, which are isolated by suitable means.

The polyfluoroalkyl amines of the formula $H(CF_2)_nCH_2NH_2$ differ sharply from the corresponding alkyl amines of the formula

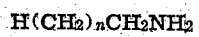

$H(CH_2)_nCH_2NH_2$

For example, they are only weakly basic. An even more striking difference lies in the fact that, on diazotization, they lead directly to diazofluoroalkanes, rather than decomposing to the corresponding alcohol and nitrogen, as is the rule with aliphatic amines. The polyfluoroalkyl amines having seven or more carbon atoms, and particularly those within the range of seven to thirteen carbon atoms, are excellent cationic surface-active agents in the form of their water-soluble acid salts. In particular, these surface-active agents are highly effective in assisting the dispersion polymerization of polymerizable ethylenic compounds in aqueous systems.

The invention is illustrated in the following examples, in which parts are by weight unless otherwise stated.

Example I

A mixture of 11 parts of octafluoropentanoic acid, $H(CF_2)_4COOH$, 8 parts of thionyl chloride, and 2 drops of pyridine, was heated to reflux for one hour, during which time hydrogen chloride was evolved. Distillation of the reaction product gave 9 parts (76% yield) of octafluoropentanoyl chloride, B. P. 84.6° C.–86.6° C.

Octafluoropentanoyl chloride (9 parts) was added dropwise with cooling and stirring to 23 parts of 28% ammonium hydroxide. Octafluorovaleramide precipitated as a white solid (7 parts; 85% yield) which could be recrystallized from hot water to give white leaflets melting at 79° C–80° C.

*Anal.*—Calcd. for $C_5H_3F_8ON$: F, 62.0; N, 5.7. Found: F, 62.8; N, 5.66

A solution of 39 parts of octafluorovaleramide in 125 parts of absolute diethyl ether was added at the rate of 1–2 drops per second to a well-stirred, nitrogen-blanketed solution of 20 parts of lithium aluminum hydride, $LiAlH_4$, in 125 parts of absolute diethyl ether, the reaction mixture being cooled in a solid carbon dioxide-acetone bath. There was some sparking at the beginning of the reaction. After completion of the addition, the mixture was allowed to come to room temperature to insure more complete reaction, then it was again cooled in a carbon dioxide-acetone bath. To the cooled reaction mixture was added dropwise 100 parts of water, which again caused sparking in the beginning. The resulting gelatinous mixture was filtered, the solid residue stirred with 100 parts of water and filtered and both filtrates were combined. The water layer in the combined filtrate was separated from the ether layer and extracted with 70 parts of ether. The ether portions were combined, dried and distilled. There was obtained 19 parts (51.7% yield) of octafluoroamylamine, $H(CF_2)_4CH_2NH_2$, boiling at 123° C.–124° C. at atmospheric pressure.

*Anal.*—Calcd. for $C_5H_5F_8N$: F, 65.7; N, 6.06; neutralization equivalent, 231.1. Found: F, 65.8; N, 6.06; neutralization equivalent, 231.1.

The amine is a clear, colorless liquid, slightly basic and of limited solubility in water. Its hydrochloride is water soluble but insoluble in dilute hydrochloric acid.

Example II

A mixture of 25 parts of hexadecafluorononanoic acid $H(CF_2)_8COOH$, and 11.65 parts of phosphorus pentachloride was melted together and refluxed for 30 minutes after the exothermic reaction had subsided. The liquid reaction product was cooled and added dropwise to 90 parts of 28% ammonium hydroxide with stirring and cooling in ice. A white, soapy, unfilterable gel formed. The reaction mixture was then made acidic with concentrated hydrochloric acid and cooled, which made it filterable. The solid thus obtained, a mixture of amide and acid, was triturated in 100 parts of water just made alkaline with ammonia, and the resulting mixture was filtered to give the solid amide, which was taken up in 400 parts of boiling toluene. This solution was filtered and the solvent partly evaporated. On cooling, there was obtained 12 parts (48% yield) of white leaflets of hexadecafluorononanoic acid amide, M. P. 143° C.–145° C.

*Anal.*—Calcd. for $C_9H_3F_{16}ON$: F, 68.2; N, 3.14. Found: F, 70.2; N, 2.95.

A solution of 12 parts of hexadecafluorononanoic acid amide in 105 parts of absolute diethyl ether was added to a stirred, nitrogen-blanketed solution of 3.1 parts of lithium aluminum hydride in 315 parts of absolute diethyl ether while cooling to the temperature of a solid carbon dioxide-acetone mixture. The reaction took place smoothly and the addition was completed within 30 minutes. The reaction mixture was then heated to reflux for 45 minutes, then cooled and treated with 100 parts of water. The resulting mixture was steam-distilled and the organic layer in the distillate was separated, dried and distilled. There was obtained 7 parts (60% yield) of hexadecafluorononylamine, $H(CF_2)_8CH_2NH_2$, B. P. 86° C.–89° C. at 15 mm. pressure.

*Anal.*—Calcd. for $C_9H_5F_{16}N$: F, 70.5; N, 3.25; neutralization equivalent, 431.1. Found: F, 71.4; N, 3.29; neutralization equivalent, 442.5.

The hydrochloric acid salt of hexadecafluorononylamine was a white solid soluble in water to the extent of about 0.5%.

*Anal.*—Calcd. for $C_9H_6F_{16}ClN$: F, 65.1; N, 2.99; Cl, 7.59. Found: F, 65.8; N, 3.08; Cl, 7.54.

Example III

To 5.5 parts of dodecafluoroheptanoic acid, $H(CF_2)_6COOH$, was added 3.3 parts of phosphorus pentachloride. After the exothermic reaction had subsided, the mixture was brought to reflux, then cooled and added slowly to 90 parts of 28% ammonium hydroxide. The precipitate which formed was filtered, washed with 50 parts of water and dried. There was thus obtained 5.3 parts (96.8% yield) of dodecafluoroheptanoic acid amide, M. P. 118–119° C.

By reacting 23.6 parts of dodecafluoroheptanoic acid amide with 7.86 parts of lithium aluminum hydride in anhydrous ether as described in Example II, there was obtained 9.8 parts (43.2% yield) of dodecafluoroheptylamine,

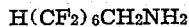

$H(CF_2)_6CH_2NH_2$

B. P. 68° C.–69° C. at 25 mm. pressure.

*Anal.*—Calcd. for $C_7H_5F_{12}N$: N, 4.23; neutralization equivalent, 331.1. Found: F, 4.34; neutralization equivalent, 332.

It will be understood that the above examples are merely illustrative and that the present invention broadly comprises the primary polyfluoroalkyl amines having the formula $H(CF_2)_nCH_2NH_2$ wherein $n$ is an even integer at least equal to 4, and the water-soluble acid salts thereof, and the process of preparing these amines from the corresponding polyfluoroalkanoic acid amides.

The preparation of the amides of this invention other than those of the examples may be readily accomplished by following the indicated procedure starting with the polyfluoroalkanoic acid corresponding to the desired amine. Other amines of this invention in addition to those of the examples are: eicosafluoroundecyl amine, $H(CF_2)_{10}CH_2NH_2$; tetracosafluorotridecyl amine, $H(CF_2)_{12}CH_2NH_2$; dotriacontafluoroheptadecyl amine, $H(CF_2)_{16}CH_2NH_2$; and tetracontafluoroheneicosyl amine, $H(CF_2)_{20}CH_2NH_2$. The more accessible and therefore preferred amines of this class are those wherein the integer $n$ has even values from 4 to 20, for the reason that the corresponding polyfluoroalkanoic acids used as starting materials are more readily obtainable. Still more preferred are the amines wherein $n$ is an even integer from 6 to 12, for the already noted reason that these amines, in the form of their water-soluble salts (e. g., hydrochlorides, sulfates, phosphates, acetates, and the like) are outstanding dispersing agents, especially useful in the direct preparation of polymer dispersions by polymerization of ethylenic monomers in aqueous systems. This is shown, for example, by the following in which ethylene was polymerized in an aqueous system comprising hexadecafluorononylamine hydrochloride as the dispersing agent:

A solution of 1 part of hexadecafluorononylamine hydrochloride in 200 parts of copper-free deoxygenated water was charged into a rocking autoclave having a capacity of 1500 parts by volume, together with 0.5 part of α,α'-azobis-(diisobutyramidine) hydrochloride, a water-soluble azo initiator. The autoclave was flushed with nitrogen, evacuated, pressured with ethylene at 900–1000 atm., then rocked at 65° C. until about 100 atm. of ethylene had been absorbed, which required about 2 hours. There was obtained a fluid, milky dispersion of ethylene polymer, containing 17.5% total solids. Electron photomicrographs showed that the polymer particles were spheroidal and about 0.5 micron in diameter.

The degree of water solubility of the salts of these amines will vary greatly. As shown above, relatively slight water-solubility, e. g., one part of the salt in 200 parts of water is sufficient for the salt to function as an excellent dispersing agent and even a lesser degree of water-solubility is not objectionable. However, to function as dispersing agents the salts must have some appreciable degree of water-solubility, a common characteristic possessed by the salts of the preferred amines with such usual acids as hydrochloric, sulfuric, phosphoric, and acetic acids.

In the process of this invention, the polyfluoroalkanoic acid amide may be reacted with any hydrogenating agent capable of reducing the amido carbonyl group to a methylene group. Amides are known to be resistant to hydrogenation and the use of a powerful reducing agent is in general necessary. Among these may be mentioned sodium amalgam and aluminum amalgam. Lithium aluminum hydride and sodium borohydride are particularly effective.

Any inert anhydrous solvent for the reactants is suitable, including for example ethers such as di-n-propyl ether, di-n-butyl ether, tetrahydrofuran, etc.; hydrocarbons such as cyclohexane, benzene, toluene; and heterocyclics such as pyridine and tetramethylene cyclic sulfone.

To insure more complete reaction, the reducing agent is preferably used in excess over the stoichiometric amount, although that is not essential. Desirably, there is used between 1.5 and 5 equivalents of reducing agent relative to the polyfluoroalkanoic acid amide. Normally, the reaction is carried out at atmospheric pressure but this is a matter of convenience and is not critical. For purposes of control, the reactants separately dissolved in the selected anhydrous solvent will preferably be combined gradually with the reaction mixture maintained in a cooling bath below 0° C. Thereafter, the reaction mixture can be allowed to come to room temperature or higher to insure more complete reaction. The temperature is not critical in so far as what reaction will take place and simply will be adjusted as a matter of control and safe procedure and insuring that the reaction is reasonably complete.

The polyfluoroalkyl amine may be isolated from the reaction mixture by any convenient method, such as solvent extraction followed by distillation, steam distillation, acid extraction and the like. These amines are stable and can be subjected to the usual chemical treatments without deterioration.

The polyfluoroalkylamines of this invention are useful as intermediates in the preparation of polyfluorinated chemicals through the various reactions of the amine group. They are also useful per se, or in the form of acid salts, for example, as rodent repellents, corrosion inhibitors, flotation agents, and surface-active agents.

As many apparently widely different embodiments of this invention may be made without departing from the spirit and scope thereof, it is to be understood that the invention is not limited to the specific embodiments thereof except as defined in the appended claims.

The invention claimed is:

1. A fluorocarbon compound from the group consisting of the primary polyfluoroalkyl amines having the formula $H(CF_2)_nCH_2NH_2$ wherein $n$ is an even integer from 6 to 12, inclusive, and the water-soluble acid salts thereof.
2. Dodecafluoroheptylamine.
3. Hexadecafluorononylamine.

JAMES ELLIOT CARNAHAN.
HERMAN JULIAN SAMPSON.

References Cited in the file of this patent

UNITED STATES PATENTS

| Number | Name | Date |
|---|---|---|
| 2,515,246 | McBee et al. | July 18, 1950 |

FOREIGN PATENTS

| Number | Country | Date |
|---|---|---|
| 583,874 | Great Britain | Jan. 1, 1947 |

OTHER REFERENCES

Swarts: Rec. Trav. Chim. vol. 28, p. 143 (1909).
Nystrom et al.: J. A. C. S., vol. 70, pp. 3738–40 (1948).
Friedman et al.: A. C. S. 116th Meeting, Abstracts of Papers, Sept. 1949, pp. 5M–6M.